March 21, 1961 D. L. REID ET AL 2,975,537
VISIBLE RECORD SIGNAL DEVICE
Filed July 7, 1958

INVENTORS:
DONALD L. REID
SAMUEL ASTON LOYD
BY
Gary, Desmond & Parker
Att'ys.

United States Patent Office
2,975,537
Patented Mar. 21, 1961

2,975,537

VISIBLE RECORD SIGNAL DEVICE

Donald L. Reid, Proffit, and Samuel Aston Loyd, Waynesboro, Va., assignors to Acme Visible Records, Inc., Crozet, Va., a corporation of Delaware Filed July 7, 1958, Ser. No. 746,916
4 Claims. (Cl. 40—18)

This invention relates to visible record signal means.

More particularly, the present invention relates to visible index record means wherein a plurality of record cards, or holders for the record cards, are pivotally mounted on, for example, a holder tray, in an overlapped, edgewise, regularly spaced arrangement defining visible marginal edge portions embodying, or adapted to receive, index or other reference indicia or combinations thereof, for example the name of a person, article, geographic location, and the like, with reference data for follow up purposes, inventory control, credit rating, and the like.

The present invention is particularly concerned with the provision of signal means for record cards of the foregoing class, the signals being longitudinally reciprocable and having a lower end portion adapted to alternately overlie the marginal edge portion of the card and to be substantially withdrawn therefrom for signalling relationship therewith. This is accomplished in accordance with the present invention by the provision of signal strips of contrasting color engaged within a plurality of aligned slits disposed adjacent to and along the lower edge of the record card, the signal strip being longitudinally displaceable for the indicated signalling purposes, but otherwise retained in a positive manner so that it cannot be accidentally displaced but, on the contrary, is securely engaged and retained on the record card, from which it may, however, be conveniently withdrawn or replaced in a positive manner, as for example when it is desired to add or subtract a desired number of signal strips or when it is desired to change the color of the strips for signalling or contrasting purposes.

Other objects and advantages, including the details of construction, arrangement of parts, and the economies thereof, will be apparent from a consideration of the following specification and accompanying drawings, wherein.

Figure 1:
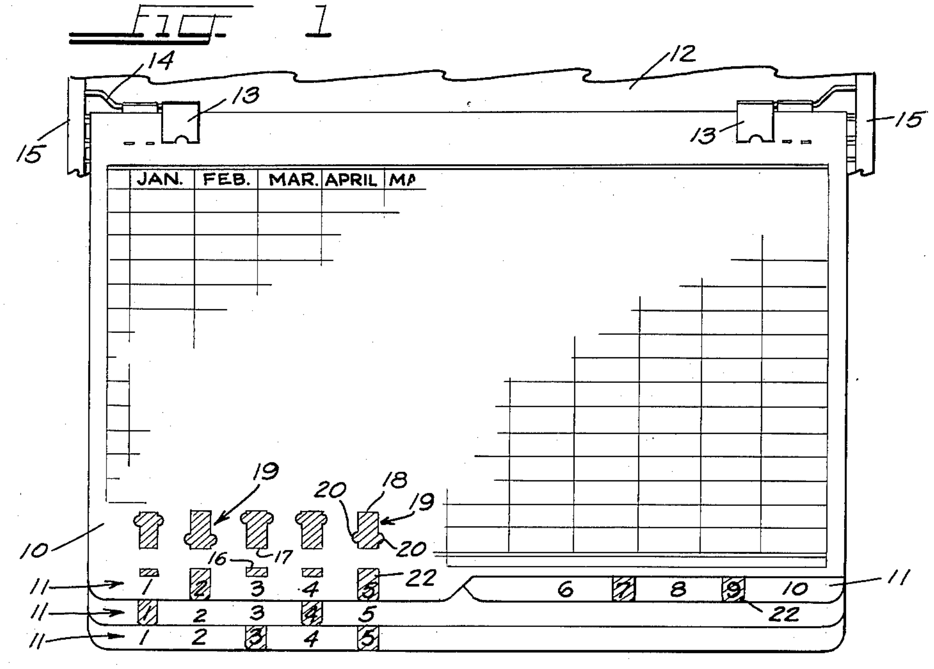
Fig. 1 is a face view of a plurality of record cards embodying the present invention, pivotally mounted on a supporting tray or holder.
Figure 2:
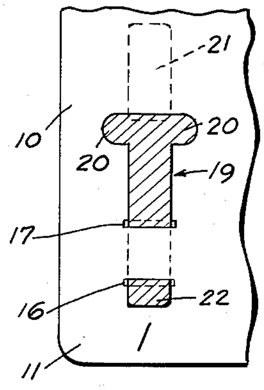
Fig. 2 is an enlarged fragmentary detail view showing a lower corner portion of a record card with a signal strip of the present invention in raised position.
Figure 3:
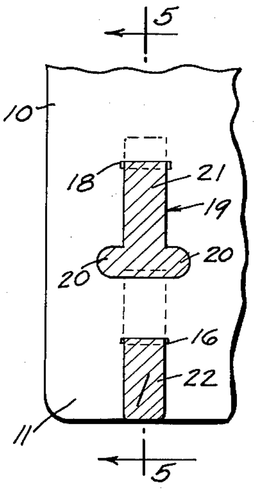
Fig. 3 shows the same view with the signal in lowered position.
Figure 4:
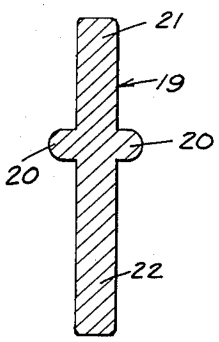
Fig. 4 is a face view of a separated signal strip.

Referring to the drawings, reference numeral 10 indicates a record card carrying index indicia in its lower marginal edge portion 11, the record card in the illustrated arrangement being pivotally mounted on a tray or holder 12 by means of the hinges 13 secured to the upper marginal edge of the card 10, these hinges in turn being pivotally supported on the flexible wire hanger 14, the ends of which are disposed beneath the opposed pair of inwardly open flanges 15, 15 forming a part of the holder tray 12. A plurality of record cards 10 are mounted as shown in Fig. 1 in endwise, overlapped, edgewise, regularly spaced group so as to define visible lower marginal edge or indicia-carrying portions 11.

It will be understood that other hinging means for pivotally mounting the indicated record cards may be employed, and that although not shown these record cards 10 instead of being directly hinged may be disposed within pockets; that is, within or on card bodies which are themselves hinged in a manner similar to the cards shown in Fig. 1 but which comprise a transparent sheath embracing the lower marginal edge to receive the lower marginal edge of the card 10. As well known, these are further formed with intermediate body slits as, for example, oblique slits adapted to receive the upper corners of the record 10 in conventional manner. It will be understood that the record cards 10 may have a continuous marginal edge as shown by the two lowermost cards in the present illustration of Fig. 1, or they may have a stepped lower marginal edge so that a companion pair of record cards may be engaged on the same hanger, one having a right-hand index and the other a left-hand index or exposed margin component, as shown by the two uppermost cards 10 in Fig. 1.

It will also be understood that although the record card body 10 is conventionally composed of flexible paperboard or cardboard, it may in the alternative be composed of flexible plastic sheet material of laminates of paper and plastic sheets.

In accordance with the present invention, the card body 10 is provided with one or more groups of slits adjacent its lower marginal edge and when more than one group of slots are employed, they are laterally spaced along the lower marginal edge of the card in desired number. Thus, for example, when signalling is to be a combination of days of the week, there will be seven groups of slits, etc.

Each group of slits comprises an outermost slit 16 parallel to the lower marginal edge of the card body and spaced from the lower marginal edge a distance substantially equal to that between the spacing between the lower edges of the adjacent cards in the group shown in Fig. 1. This slit 16 is complemented by a closely adjacent aligned slit 17 and a more inwardly and a relatively remotely spaced aligned slit 18.

For cooperation with the slits there is provided an elongated single strip generally indicated as 19 of contrasting color to the card body for signalling association therewith, the strip 19 being conventionally composed of a flexible plastic material such as cellulose acetate, and which may be transparent, the main shank or body portion thereof being of a width substantially equal to the length of the slits 16, 17 and 18 and is formed substantially medially with a pair of laterally, oppositely extending ears 20, 20 which extend beyond the terminal ends of the respective slits, so that when the opposed end portions 21 and 22 of the signal strip are projected downwardly through the slits 18 and 17, respectively, the signal strip can be reciprocated in a direction longitudinally thereof within the slits to the limits defined by the ears 20, 20 and the spacing between the slits 17 and 18. This limit of movement is substantially equal to the distance between the slit 16 and the lower marginal edge of the card 10.

For signalling purposes the lower end 22 of the signal strip is projected upwardly through the slit 16 onto the card body so that reciprocation of the strip 19 will cause the end 22 to alternately overlie or to be withdrawn from the end or index portion of a card 10 for cooperative signalling relationship with the indicia embodied on the edge portion 11. It will thus be seen that if signalling with respect to a single area of the card body is desired, only a single signal may be employed and a single set of slots provided. On the other hand, a single signal may be employed or engaged in one group of a body having a plurality of groups. Of course, as many signals may be employed as there are groups of lists, and various visible or coded combinations.

These signal strips may be actuated by manipulation of the ears 20, 20, or by manipulation of the exposed lower end 22 or the upper terminal end 21 lying beneath the card body, which may be facilitated by flexing of the card body relative to the ends of the signal strip, or vice versa.

Although we have shown and described the preferred embodiment of our invention, it will be understood by those skilled in the art that various modifications may be made in the details without departing from the spirit and scope thereof as set forth in the following claims.

We claim:

1. Visible record signal means comprising a substantially rectangular flexible base member formed with a slit parallel and adjacent to one of its marginal edges, an inwardly disposed aligned slit parallel and closely adjacent to the former, and a more inwardly disposed aligned slit parallel and relatively remote from the latter, and a flat signal strip of flexible material and contrasting color of a width substantially that of the length of said slits including an opposed pair of laterally projecting ears medially of the length of the strip extending from side edge portions of lesser length than the distance between said inwardly disposed slits, said signal strip and the ears thereof overlying said base member and said strip endwise projecting through the two inwardly disposed remotely spaced slits, with one end of said signal return-projecting through said outermost slit and adapted to thereby alternately endwise overlie the adjacent marginal edge portion of the base member and to be substantially withdrawn therefrom, for signalling relationship therewith, by longitudinal displacement of the signal strip in said slits to the limits defined by said ears between the relatively remotely spaced inwardly disposed slits.

2. Visible record signal means comprising a substantially rectangular flexible base member formed with a plurality of laterally spaced groups of slits, each group comprising a slit parallel and adjacent to one of the marginal edges of the base member, an inwardly disposed aligned slit parallel and closely adjacent to the former, and a more inwardly disposed aligned slit parallel and relatively remote therefrom, and a complementary plurality of flat signal strips of flexible material and contrasting color each of a width substantially that of the length of said slits and including an opposed pair of laterally projecting ears medially of the length of the strip extending from side edge portions of lesser length than the distance between said inwardly disposed slits, said signal strips and the ears thereof overlying said base member and said strip endwise projecting through a pair of two inwardly disposed remotely spaced slits, with one end of the signal strip return-projecting through a companion outermost slit and adapted to thereby alternately endwise overlie the adjacent marginal edge portion of the base member and to be substantially withdrawn therefrom, for signalling relationship therewith, by longitudinal displacement of the signal strips in said slits to the limits defined by said ears between the relatively remotely spaced inwardly disposed slits.

3. Visible record signal means comprising a plurality of substantially rectangular flexible base members pivotally mounted in an overlapped edgewise regularly spaced group defining visible marginal edge portions, each formed with at least one group of slits comprising a slit parallel and adjacent to its said exposed marginal edge, an inwardly disposed aligned slit parallel and closely adjacent to the former, and a more inwardly disposed aligned slit parallel and relatively remote therefrom and generally concealed by an overlying one of said members, and an elongated flat signal strip of flexible material and contrasting color of a width substantially that of the length of said slits including an opposed pair of laterally projecting ears medially of the length of the strip extending from side edge portions of lesser length than the distance between said inwardly disposed slits, said signal strip and the ears thereof overlying said base member and said strip endwise projecting through the two inwardly disposed remotely spaced slits, with one end of said signal return-projecting through said outermost slit and adapted to thereby alternately endwise overlie the adjacent exposed marginal edge portion of the base member and to be substantially withdrawn therefrom by longitudinal displacement of the signal strip in said slits to the limits defined by said ears between the relatively remotely spaced inwardly disposed slits.

4. Visible record signal means comprising a record card member formed with a slit parallel and adjacent to its lower marginal edge, an inwardly disposed aligned slit parallel and closely adjacent to the former, and a more inwardly disposed aligned slit parallel and relatively remote therefrom, and a flat signal strip of flexible material and contrasting color of a width substantially that of the length of said slits including an opposed pair of laterally projecting ears medially of the length of the strip extending from side edge portions of lesser length than the distance between said inwardly disposed slits, said signal strip and the ears thereof overlying the card and said strip endwise projecting through the two inwardly disposed remotely spaced slits, with one end of said signal return-projecting through said outermost slit and adapted to thereby alternately endwise overlie indicia carried by the adjacent lower marginal edge portion of the card and to be substantially withdrawn therefrom by longitudinal displacement of the signal strip in said slits to the limits defined by said ears between the relatively remotely spaced inwardly disposed slits.

References Cited in the file of this patent

UNITED STATES PATENTS

| | | |
|---|---|---|
| 1,566,734 | Chase | Dec. 22, 1925 |
| 2,625,759 | Koepke | Jan. 20, 1953 |

FOREIGN PATENTS

| | | |
|---|---|---|
| 145,381 | Austria | Apr. 25, 1936 |